United States Patent [19]
Struthers

[11] Patent Number: 5,366,828
[45] Date of Patent: Nov. 22, 1994

[54] METAL ALLOY LADED CARBON AEROGEL HYDROGEN HYDRIDE BATTERY

[76] Inventor: Ralph C. Struthers, 39503 Calle El Fuente, Saugus, Calif. 91350

[21] Appl. No.: 148,964

[22] Filed: Nov. 8, 1993

[51] Int. Cl.$^5$ .......................................... H01M 10/36
[52] U.S. Cl. ................................... 429/101; 429/209; 429/223; 29/623.5
[58] Field of Search ............... 429/101, 209, 223, 218, 429/59; 420/900; 502/406, 416, 439; 428/408; 264/105; 423/415 R; 29/623.1, 623.5

[56] References Cited

U.S. PATENT DOCUMENTS

| | | | |
|---|---|---|---|
| 2,093,454 | 9/1937 | Kistler | 423/252 |
| 3,650,102 | 3/1972 | Economy et al. | 264/211.16 X |
| 3,960,601 | 6/1976 | Schulz | 429/212 |
| 3,972,735 | 8/1976 | Breault | 204/294 X |
| 4,610,863 | 9/1986 | Tewari et al. | 423/338 |
| 4,997,804 | 3/1991 | Pekala | 502/418 |
| 5,135,589 | 8/1992 | Fetcenko et al. | 420/900 X |

Primary Examiner—Anthony Skapars
Attorney, Agent, or Firm—Georges A. Maxwell

[57] ABSTRACT

A hydrogen hydride battery including a stack of like cells. Each cell includes novel positive cathode and negative anode electrodes. The negative anode electrodes include micro-porous carbon aerogel structures of randomly disposed interengaged carbon fibers in three-dimensional reticulate form and a hydrogen-absorbing metal alloy structure throughout and conforming generally to and carried by the micro-porous carbon aerogel. The positive cathode electrodes include micro-porous carbon aerogel structures of randomly disposed interengaged carbon fibers in three-dimensional reticulate form that are impregnated with nickelous hydroxide throughout and conforming generally to and carried by the micro-porous carbon aerogel. Central electrolyte separators established of a suitable porous dielectric material, is positioned between positive and negative electrodes.

11 Claims, 3 Drawing Sheets

Fig. 5.

CHARGING BATTERY:

Negative Electrode: $M + H_2O + e^- \rightarrow M\text{-}H + OH^-$

Positive Electrode: $Ni(OH)_2 + OH^- \rightarrow NiOOH + H_2O + e^-$

Net Cell: $M + Ni(OH)_2 \rightarrow M\text{-}H + NiOOH$

DISCHARGING BATTERY:

Negative Electrode: $M\text{-}H + OH^- \rightarrow M + H_2O + e^-$

Positive Electrode: $NiOOH + H_2O + e^- \rightarrow Ni(OH)_2 + OH^-$

Net Cell: $M\text{-}H + NiOOH \rightarrow M + Ni(OH)_2$

METAL ALLOY LADED CARBON AEROGEL HYDROGEN HYDRIDE BATTERY

BACKGROUND OF THE INVENTION

In the art of fuel cells and batteries, there is an ongoing search for new and improved hydrogen-fueled power-generating cells and/or power-storing batteries suitable for powering electrical vehicles and such that the use of vehicles that are powered by hydrocarbon fuels can be advantageously phased out.

Recent and promising developments in the prior art has been the development of improved hydrogen-absorbing metal alloy structures for establishing the electrodes in nickel-metal hydride hydrogen storage electrochemical cells. The most recent and promising of those alloy structures are porous structures established by reducing previously established alloys into fine powdered form and sintering the powdered metal alloys to establish structurally stable integrated porous metal structures that have as much surface area and as many active sights that each weight unit of the metal alloy can present when worked upon in its metallic state.

To the best of my knowledge and belief, the minimum mean or average pore size in those sintered powdered metal alloys provided by the prior for establishing the electrodes of hydrogen hydride batteries or the like is greater than one micron. A porous metal alloy hydride electrode structure with a mean pore size of one micron and presenting enough effective surface area and active sights to serve practical needs results in an electrode structure that is quite heavy and large and structure that includes such a great amount of costly metals that its size, weight and/or cost are highly likely to be excessive for use in the establishment of batteries for most uses.

In accordance with the above, prior to my invention, there existed a yet-to-be-satisfied need to notably decrease the pore size and thereby increase the surface area and active sights for each weight unit of porous metal alloy used to establish the electrodes in hydrogen hydride batteries and to thereby notably decrease the size, weight and amount of costly metals required to establish effective and efficient electrode structures for use in such batteries.

PRIOR ART

The making those useful structurally stable, micro porous materials called aerogels is old in the art. Aerogels were invented in the 1930s by Samuel S. Kistler. Their manufacture is described in U.S. Pat. No. 2,093,454, issued to Samuel S. Kistler on Sep. 21, 1937 and entitled, "Method of producing Aerogels."

The manufacture of carbon aerogels is described in U.S. Pat. No. 4,997,804, issued to Richard W. Pekala on Mar. 5, 1991 and entitled, "Low Density. ResorcinoI-Formaldehyde Aerogels."

The manufacture of aerogels is described in U.S. Pat. No. 4,610,863, issued to Arlon J. Hunt, et al. on Sep. 9, 1986 and entitled, "Process For Forming Transparent Aerogel Insulating Arrays."

The manufacture of ResorcinoI-Formaldehyde novolacs fibers is described in U.S. Pat. No. 3,650,102, issued Mar. 21, 1972 and entitled, "Fibers From Novolacs."

The manufacture of carbonizing fibers for fuel cell electrodes is described in U.S. Pat. No. 3,960,601, issued Jun. 1, 1976 and entitled, "Fuel Cell Electrode; and, in U.S. Pat. No. 3,972,735, issued Aug. 3, 1976 and entitled, "Method For Making Electrodes For Electrochemical Cells."

One method of manufacture of hydrogen storage alloy material for nickel metal-hydride battery electrodes is described in U.S. Pat. No. 5,135,589, issued to Michael A. Fetcenko, et al, on Aug. 4, 1992 and entitled, "Metastable Hydrogen Storage Alloy Material."

The potential use of carbonized aerogels as carriers of materials has been alluded to in the teachings of prior art, but I am unaware of any teachings that serve to suggest or explain how such aerogels might be advantageously and effectively made and/or put to such use.

The provision and use of negative hydrogen-storing metal and positive nickelous hydroxide laded microcellular carbon aerogel hydrogen hydride battery electrodes, which is the subject of my invention, is understood and believed to be new and is believed to constitute a patentable advance in the art of metal hydride batteries.

OBJECTS AND FEATURES OF MY INVENTION

It is an object of my invention is to provide for an improved metal laded carbon aerogel hydrogen hydride battery that is characterized by hydrogen absorbing metal alloy laded micro-porous carbon aerogel electrodes that present notable greater surface area and increased active sites with the use or notably less costly metal and that can be made substantially smaller and lighter than comparable metal alloy, hydrogen-storing, electrodes provided by prior art.

It is another object and a feature of my invention is to provide a metal laded carbon aerogel hydrogen hydride battery that has high energy density, high power, long life and tolerance to abuse, wide temperature tolerances and is quickly rechargeable.

Yet another object and a feature of my invention is to provide a novel negative electrode structure for a battery of the character referred to above that includes a micro-porous three-dimensional reticulate carbon carrier that is laded with multiplicities of submicron-sized particles of metal alloys having different crystalline structure and that are in disordered array throughout the carbon carrier and a structure wherein the particles of metal are fused and integrally joined together and are related to the carbon carrier to establish a strong and durable micro-porous electrode structure having great surface area and many active sites.

Still another object and a feature of my invention is to provide a novel positive electrode structure for a battery of the character referred to above that includes a micro-porous three-dimensional reticulate carbon carrier that is laded with nickelous hydroxide.

The foregoing and other objects and features of my invention will be apparent and will be understood and will become apparent from the following detailed description of preferred form and embodiments of my invention throughout which description reference is made to the accompanying drawings.

DESCRIPTION OF THE DRAWINGS

FIG. 5 is the chemical formula that describes the operation of charging and discharging battery shown in FIG. 3 of the drawings.

DETAILED DESCRIPTION OF THE INVENTION

Figure 1:
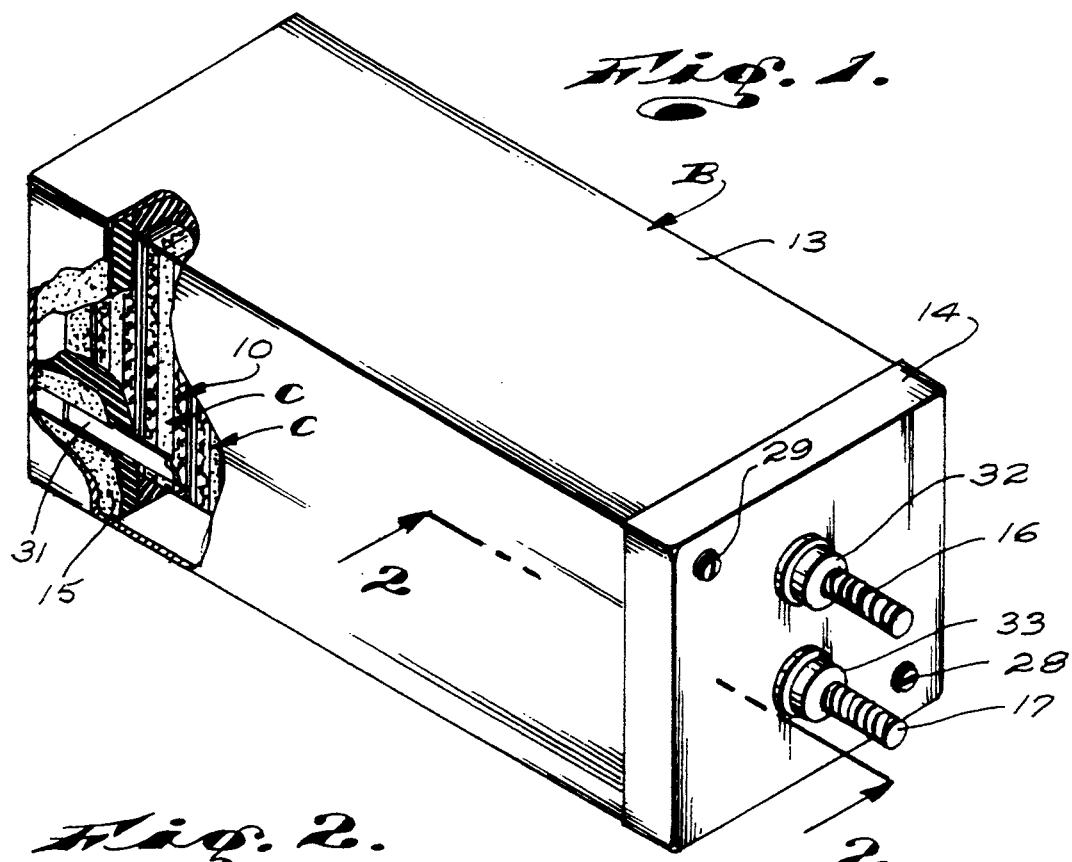
FIG. 1 is an isometric view of a battery embodying my invention with portions broken away to show details of the invention.
Figure 2:
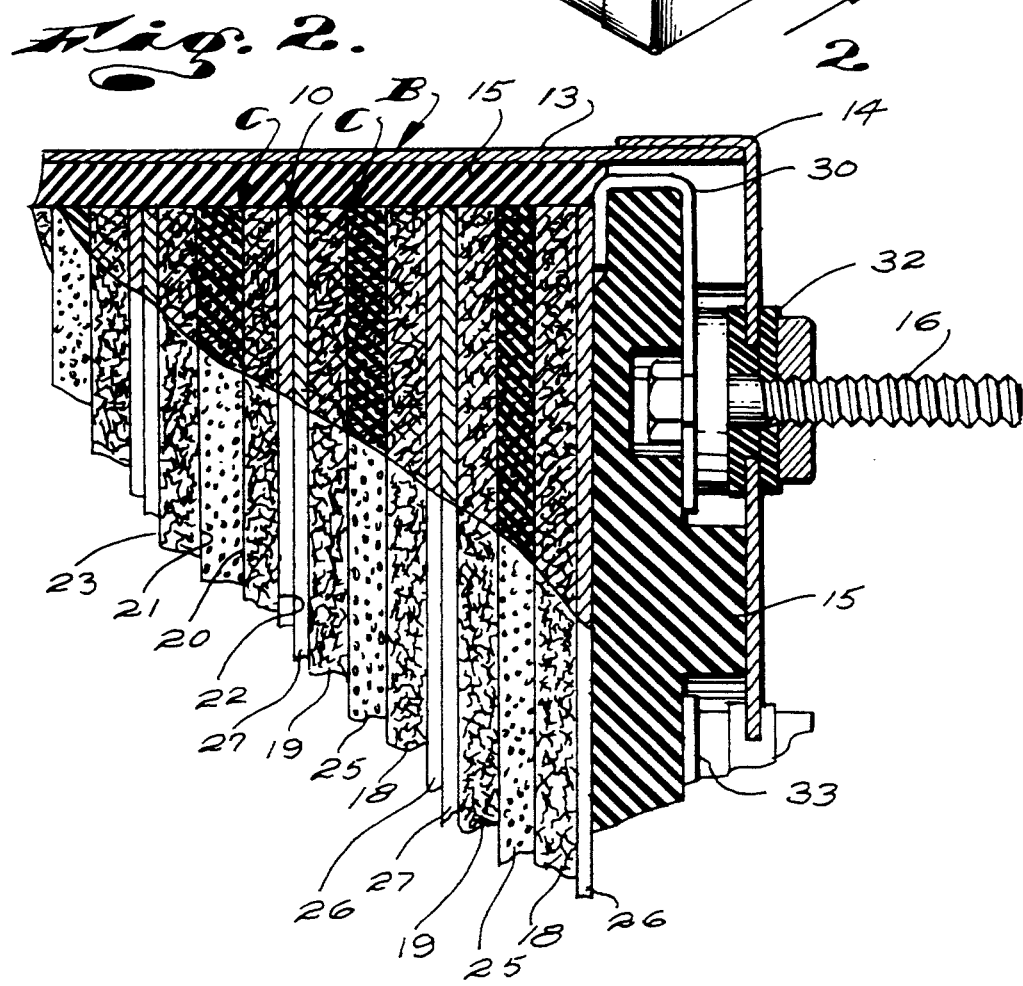
FIG. 2 is an enlarged sectional view taken as indicated by line 2—2 in FIG. 1.

In FIG. 1 of the drawings, I have illustrated one typical storage battery structure B embodying my invention. The battery B can, for example, be a 120-volt direct current battery including a stack 10 of 100 cells C. The battery B is shown as including a box-like case 13. The case 13 can, for example, be established of nickel-plated steel. Insulator sheets 15 are provided to electrically insulate the cell stack C from the walls of the case 13. As shown, the case 13 includes a removable end wall or cover plate 14 to facilitate assembly of the battery. The plate 14 is shown carrying outwardly projecting positive and negative terminal posts 16 and 17 that connect with the opposite ends of the stack 10 of cells within the case. Seals 32 and 33 seal between the cover plate 14 and the terminals 16 and 17, in accordance with common practices.

In addition to the above and in accordance with common practices, the cover plate 14 of the case is provided with vent fittings 28 and 29 that facilitate filling of the case and saturating parts of the cells C of the battery B with a suitable electrolyte (not shown).

Figure 3:
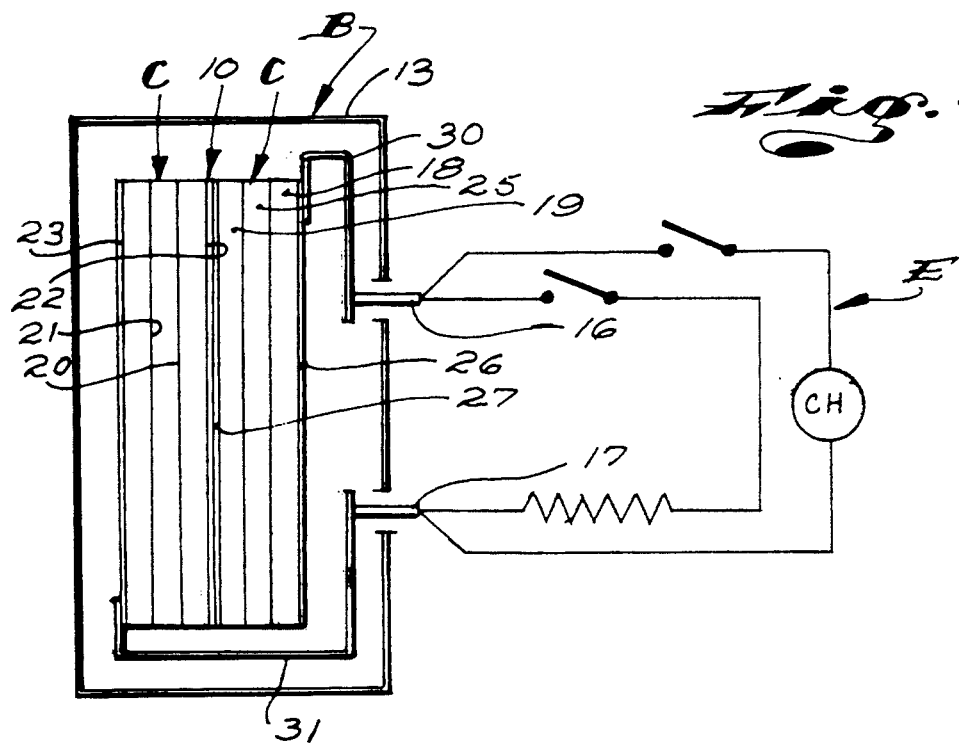
FIG. 3 is a diagrammatic view of a two-cell stack metal laded carbon aerogel hydrogen hydride battery embodying my invention.

In FIG. 3 of the drawings, I have diagrammatically illustrated a series circuit including a stack 10 of two cells C. Each cell includes flat plate-like negative anode and positive cathode electrodes 18 and 19. The electrodes 18 and 19 have flat opposing inner faces 20 and 21 and flat oppositely disposed outer faces 22 and 23. A central electrolyte separator 25 established of a suitable porous dielectric material, such as nylon, is positioned between and is engaged by the inner faces 20 and 21 of the electrodes 18 and 19. The outer faces 22 and 23 of the electrodes 18 and 19 are covered with electron collector plates 26 and 27. The collector plates 26 and 27 can, for example, be made of nickel-plated steel foil. The opposing collector plates 26 and 27 of the two adjacent cells C in the stack 10 are in flat contacting engagement with each other. The other collector plates 26 and 27 occurring at the opposite ends of the stack 10 are suitably connected with terminal posts 16 and 17 by conductor bars 30 and 31, substantially as shown.

The stack 10 of cells C is supported within the case 13 and the, case is filled with a suitable electrolyte (not shown) that permeates the electrolyte spacers and enters portions of the electrodes and the adjacent separators. The electrolyte supports the free and unimpeded movement of hydroxyl ions (OH-)ions formed by cell reaction between electrodes.

The terminal posts 16 and 17 are shown connected with a suitable external circuit E that is selectively operable to charge the battery B and to effect the performance of useful work with power from the battery.

But for the physical nature and character of the electrodes 18 and 19, the battery B does not differ materially from batteries provided by the prior art.

Figure 4:
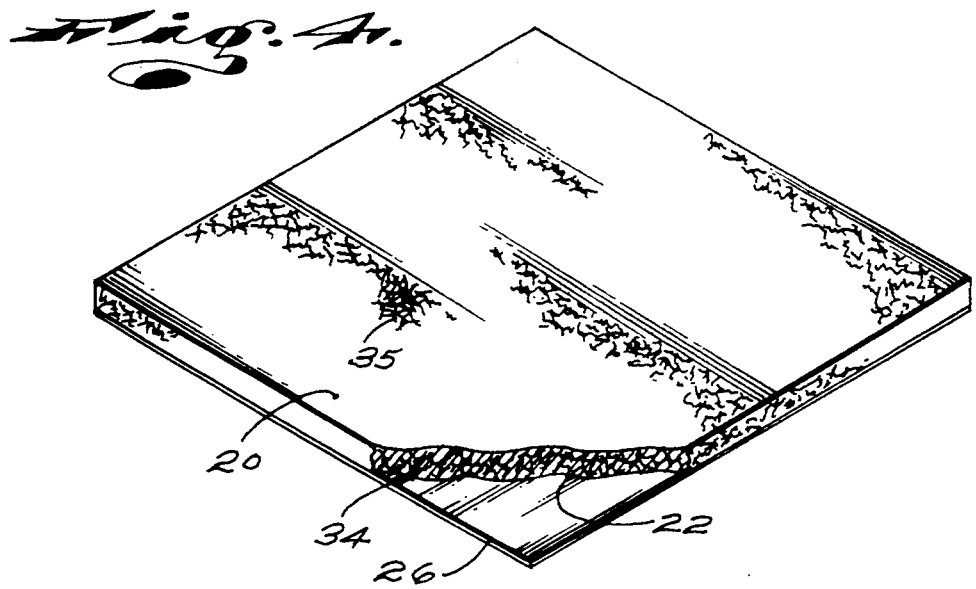
FIG. 4 is an isometric view of an electrode with a portion broken away.

In FIG. 4 of the drawings, I have illustrated a typical electrode structure. The electrodes 18 and 19 are structurally alike and each includes a micro-porous carbon aerogel 34. The carbon aerogel is an open three-dimensional net-like or reticulate structure composed of a randomly arranged array of randomly shaped interconnected carbon fibers 35. The size of the carbon fibers and the pore size of the aerogel can be varied widely as desired or as circumstances require. For example, the carbon aerogel can be made to have a density in the range of 35 to 100 mg/cc and a mean pore size as little as 0.1 micron to a size that is infinitely greater than might be utilized it, carrying out my invention.

The carbon aerogel structure 34 or carrier of negative electrode 18 is laded with submicron bodies or particles of hydrogen storage metal alloys that are disposed throughout the three-dimensional reticulate carbon structure 35 and that are interconnected or joined together to establish a three-dimensional reticulate metal alloy structure that conforms generally with and that is carried by the reticulate carbon aerogel structure.

The carbon aerogel structure 34 or carrier of positive electrode 19 is laded with nickelous hydroxide that is disposed throughout the three-dimensional reticulate carbon structure 35 and that are interconnected or joined together to establish a three-dimensional reticulate nickelous hydroxide structure that conforms generally with and that is carried by the reticulate carbon aerogel structure 35.

In the course of manufacturing the negative anode electrodes 18 organic material are made into an organic alcogel. The salts of selected hydrogen absorbing metals are added. The metal salts are reduced into a multitude of submicron-size metal particles of varying form by the application of heat. The metal particles are distributed throughout and are carried by the organic alcogel. Thereafter the metal laded alcogels are washed and cleaned; following which they are supercritically dried to establish a metal laded organic aerogel. Next the metal laded organic aerogels are fired to carbonize the organic materials and establish the metal-laded carbon aerogel. Following the foregoing, the metal-laded carbon aerogels are heated to cause the metal particles to flow and to fuse together. The metal particles, when heated to cause the metal particles to flow and to fuse together, tend to flow along at about the carbon fibers of the carbon aerogel to establish a reticulate disordered metal alloy structure that has an extraordinary amount of surface area and active sites per unit weight of metal.

The preferred process by which my new nickelous hydroxide and metal-laded carbon aerogel positive and negative electrode structures are made is as follows:

(1) Mix materials to establish organic sol

Mix resorcinol, formaldehyde, alcohol and water together with the addition of a suitable base solution as a gelling catalyst.

The quantities of materials used is variable to establish a gel having a desired pore size, weight of fiber and other characteristics. Proportioning of the materials to establish a desired gel can be determined by empirical testing procedures. The mix or sol is regulated by concentration of sols and base solution to establish a gel having desired density, surface area and pore size. Ordinarily the organic sol concentration can vary from 3 to 30 grams of solids per 100 milliliters of gel volume. A typical organic gel may contain 10 grams organic monomer resorcinol ($C_6H_4(OH)_2$) and 5 grams formaldehyde (HCHO) of solids per 100 milliliters of gel volume.

(2) Gelling the sol

The gelling of the sol established in step (1) is preferably brought about by the adding to the sol a suitable salt, such as sodium carbonate, sodium sulfate, potassium chloride, ammonium nitrate, etc., with a pH of from 6.5–9.1. The mixture of sol is suitably placed within a sealed container and is heated to a temperature of from 80 degrees C to 120 degrees C and is let to rest for a period of from 24 to 48 hours, during which the sol gels.

In practice, the sol is preferably formed atop one of the thin nickel-plated iron collector plates (for the finished electrode) when the sol is placed within a sealed container and heated. Accordingly, the sol is gelled in a thin sheet form atop the collector plate.

Sols that establish gels having less surface area per unit volume must be let to rest and/or must be subjected to greater heat than gels that establish a lesser surface area per unit volume, to effect gelling of the sol in substantially the same period of time.

(3) Adding Metal Chlorides to the Alcogel

The alcogel established in accordance with step (2) above is next saturated with a solution of metal (MA) chlorides (soluble in alcohol). The chlorides are the chlorides of hydrogen-absorbing metals, such as niobium, palladium, rhenium, tin, titanium, tungsten and vanadium. A single or a combination of different chlorides can be used, as circumstances desire. It is understood and believed that an alloy of palladium, titanium and vanadium is particularly suited for use in my new electrode structure. Accordingly, if that alloy is to be provided, chlorides of the foregoing metals, in suitable quantities, are added to the alcogel. The alcogel, saturated with the chloride sol is placed in a pressure vessel and covered with sufficient added chloride sol to cover the alcogel. The alcogel, within the vessel, is heated to about 140 degrees C and left to rest for about 24 hours, during which time the chlorides are reduced to their metal states in the form of submicron-size particles. The submicron-size particles of metal are metal alloys established from the different amounts of those chlorides that combined to make them. That is, the particles of metals established by the chlorides are not necessarily the same or identical and particles of the different metals are distributed randomly throughout the alcogel structure.

(4) Adding Metal Nitrates to the Alcogel

The alcogel established in accordance with step (2) above is next saturated with a solution of metal (MB) nitrates (soluble in water) The nitrates are the nitrates of hydrogen-absorbing metals and can include one or a combination of metal nitrates, such as the nitrates of aluminum, calcium, chromium, cobalt, copper, iron, lanthanum, lithium, magnesium, manganese, molybdenum, nickel, yttrium, and/or zirconium; A preferred combination of metal nitrates for use in my invention might include nitrates of chromium, cobalt, iron, manganese, nickel, and/or zirconium. The alcogel, saturated with the nitrates sol, is placed in a pressure vessel and covered with sufficient added nitrates sol to cover the alcogel. The alcogel, within the vessel, is heated to about 140 degrees C and left to rest for about 24 hours, during which time the nitrates are reduced to their metallic state. The metals established from the nitrates are in the form of submicron-size particles distributed randomly throughout the alcogel together with the metal particles established in step (3) above. The metal particles established by the nitrates, like the metal particles established by the chlorides, are not alloyed alike and are randomly deposited throughout the alcogel structure.

(5) Solvent exchange in the Alcogel

The solutions alcohol and water left to occur within the pores of the organic alcogel is replaced by fresh agitated organic acetone solvent by diffusion (flushing) at a temperature between 40 degrees C and 50 degrees C for a period of 2 to 4 days.

(6) Critical Drying of the Alcogel

The organic alcogel (that is cast onto the nickel-plated iron collector plate) is placed in a pressure vessel that is filled with liquid carbon dioxide. The pressure within the vessel is brought to about 900 psi and the temperature is brought to about 18 degrees C. The alcogel is allowed to stand or rest in the liquefied carbon dioxide for four hours. The liquefied carbon dioxide is then drained from the vessel to a level just above the alcogel. The vessel, above the liquefied carbon dioxide, is refilled with carbon dioxide gas. This drain-and-refill procedure is repeated four times a day for about three days. The acetone solution in the pores defined by the metal and gel are thus exchanged with or replaced by diffusion with liquefied carbon dioxide. During the foregoing procedures, the pressure and temperature within the vessel is maintained below the temperature and pressure at which the liquefied carbon dioxide will vaporize.

When the alcogel is filled with liquid carbon dioxide, the temperature is increased and the pressure is reduced within the vessel or container and the carbon dioxide gas is allowed to vaporize and is slowly removed from within the alcogel and the container or vessel at a slow and controlled rate that will not cause the alcogel to collapse or otherwise be adversely disrupted. When the carbon dioxide is removed, the alcogel has become a metal-laded organic aerogel or an organic aerogel.

(7) Carbonizing the Organic Aerogel

The metal-laded organic aerogel or organic aerogel (on its related collector plate) is placed within a sealed oven filled with an atmosphere of nitrogen gas: and is slowly, progressively heated from 5 to 600 degrees C and fired for about two hours, during which time the organic material of the aerogel is carbonized and a stable metal-laded carbon aerogel is established.

(8) Fusing the Metal Particles

After step (7) is completed, the temperature in the oven is progressively increased above 600 degrees C to temperatures where the metal alloy particles are so heated that adjacent particles are first fused together to establish an interconnected or integrally joined series of bead-like particles of integrated disordered multi-component metal alloys on and throughout the surfaces of the three-dimensional reticulate microporous structure of the carbon aerogel.

Making The Nickelous Hydroxide Carbon Aerogel Electrode

A carbon aerogel carrier structure is made in accordance with step (1),(2),(5),(6) and (7) set forth above. The carbon aerogel carrier structure is immersed in a boiling solution of nickelous nitrate ($C.Ni(NO_3)_2$) and formic acid (3HCOOH). A metal sheet of nickel (Ni) is utilized to serve as the anode and the carbon aerogel is made to serve as the cathode. Solution temperature, concentration of the nickelous nitrate (C.Ni(NO$_3$)$_2$), and current density are the important variables to be adjusted for the desired process time. The nitrate anion in the nickelous nitrate (Ni(NO$_3$)$_2$) solution is reduced electrochemically to nickel hydroxide (Ni(OH)) thereby lading the carbon aerogel with nickelous hydroxide (C.Ni(OH)$_2$). The overall reaction of the forgoing is C.Ni(NO$_3$)$_2$+3HCOOH→C.Ni(OH)$_2$+3CO$_2$+ 2NO+2H$_2$O. Upon drying the positive electrode structure is finished and ready for use.

Referring once again to the metal laded electrode structure; the fused-together metal alloyed particles or beads establish a structurally stable, three-dimensional reticulate disordered metal alloy network, the fibrous portions of which are mechanically interengaged and locked with related fibrous portions of the carbon aerogel. Accordingly, the carbon and metal structures of the electrode structure are cooperatively related to establish a structurally stable, strong, and durable micro-porous negative anode electrode structure the pore size of which is exceedingly small and wherein a small amount of disordered metal alloy is made and formed to have an exceedingly large exposed surface area establishing an exceedingly large number of active sites throughout the three-dimensional reticulate carbon structure that carries the metal alloys.

In furtherance of step (3) or the process; after the metal particles are heated to fuse together, the temperature of the negative anode electrode structure can be progressively increased to cause the metal alloys of adjacent particles to flow together and alloy to any desired extent and to cause the reticulate disordered structure of the alloys to grow and/or change as desired or as circumstances require.

The extent to which the above heating of the negative anode electrode structure is subjected is dependent upon the nature and quantities of the different metals of which the disordered metal alloy particles are made, the crystalline structure sought to be established and other variables that might be worked with when putting my invention into practice.

The metal alloys that might best be employed in practicing my invention: and, how they work to absorb hydrogen and the advantages to be attained though their use, is the subject matter of U.S. Pat. No. 5,135,589 for "Metastible Hydrogen Storage Alloy Material" issued Aug. 4, 1992 to Michael A. Fetcenko, et al. The teachings of that patent are incorporated herein by reference.

The metal-laded carbon aerogel negative anode electrode 18 with its collector plate 26 at its outer surface is assembled with its inner surface in flat uniform contacting engagement with its opposing related surface of its related electrolyte separator 25, and the nickelous hydroxide laded carbon aerogel positive electrode 19 is related, in like manner, to the other surface of the separator 25 to establish a complete cell C. A stack of cells C, establishing a battery, are series connected one to the other by the opposing collector plates of adjacent cells.

OPERATION OF THE METAL-ALLOY-LADENED MICRO-POROUS CARBON AEROGEL HYDROGEN HYDRIDE BATTERY

Referring to FIGS. 3 and 5 of the drawings, my new battery B operates as follows:

The anode fueled for each of the cells C is hydrogen (H) that is stored in the negative electrode 18 as a carbon/metal-alloy-hydride (C.M$_{AB}$H). When each cell is being charged, material (C.M$_{AB}$) of anode electrode 18 electrochemically absorbs hydrogen (H) from the water (H$_2$O) and one electron (e$^-$) that moves from the external circuit E to form the hydrogen storing metal alloy hydride (C.M$_{AB}$H) and one hydroxyl ion (OH$^-$). The hydroxyl ion moves through the 20–40% potassium hydroxide (KOH) electrolyte and the separator 25 and collects on the surfaces of the surface of the positive cathode electrode 19. When the cell C is charged, the positive cathode electrode material nickelous hydroxide (C.Ni(OH)$_2$) electrochemically absorbs the hydroxyl ion (OH$^-$) from the negative anode electrode 18 and forms nickel oxyhydroxide (C.NiOOH), water (H$_2$O), and one electron (e$^-$). The electron (e$^-$) collected by the positive cathode 19 moves through the external circuit E to collect on the surface of the negative anode electrode 18.

When the cell C is discharged, the hydrogen (H) stored in metal alloy hydride material (C.M$_{AB}$H) of the negative anode electrode 18 electrochemically absorbs one hydroxyl ion (OH$^-$) from the positive cathode electrode 19 forming water (H$_2$O), material (C.M$_{AB}$) and one free electron (e$^-$). That electron moves through the external circuit E and collects on the surfaces of the surface of the positive cathode electrode 19 along with the one hydroxyl ion (OH$^-$) that moves through the potassium hydroxide (KOH) electrolyte and the separator 25 and collects on the surface of the negative anode electrode 18. When cell is discharged, the positive cathode electrode 19 material nickel oxyhydroxide (C.NiOOH) electrochemically absorbs water (H$_2$O) and one free electron (e$^-$) from the external circuit E and forms nickelous hydroxide (C.Ni(OH)$_2$) and one hydroxyl ion (OH$^-$).

Finally, it is to be noted that if it is desired that the electrode structure that I provide include metals that are reduced from chlorides only, as in step (3) of the process noted above, step (4) of that process can be eliminated. Also, if it is desired that the electrode only include metals that are reduced from nitrates, as in step (4) above, step (3) can be eliminated.

Having described only typical preferred forms and applications of my invention, do not wish to be limited to the specific details herein set forth but wish to reserve to myself any modifications and/or variations that might appear to those skilled in the art and that fall within the scope of the following claims.

Having described my invention, I claim:

1. A micro-porous metal-laded hydride battery negative anode electrode structure including; micro-porous carbon aerogel comprising a three-dimensional reticulate structure of randomly disposed interengaged carbon fibers; and, a fiber form reticulate structure of hydrogen-absorbing metal made to substantially conform with and extending throughout the carbon aerogel in supported engagement with the carbon fibers thereof.

2. The micro-porous metal-laded hydride battery negative anode electrode structure set forth in claim 1 wherein the hydrogen-absorbing metal is made to substantially conform with the carbon aerogel by lading an alcogel structure of organic material with metal chlorides and heating the chlorides-laded alcogel structure to reduce the chlorides to their metal state and thereafter heating and reducing the organic material to carbon.

3. The micro-porous metal-laded hydride battery negative anode electrode structure set forth in claim 1 wherein the hydrogen-absorbing metal is made to substantially conform with the carbon aerogel by lading an alcogel structure of organic material with metal nitrates and heating the nitrates-laded alcogel structure to reduce the nitrates to their metal state and thereafter heating and reducing the organic material to carbon.

4. The micro-porous metal-laded hydride battery negative anode electrode structure set forth in claim 1 wherein the metal is a disordered alloy metal made to conform with the aerogel by first lading an alcogel structure of organic material with the chlorides of selected metals and then heating the chlorides-laded alcogel to reduce the chlorides to their metal state; next lading the alcogel structure with the nitrates of selected hydrogen-absorbing metals and heating the nitrates-laded alcogel to reduce the nitrates to their metal state and thereafter heating and reducing the organic material to carbon.

5. The micro-porous metal-laded hydride battery negative anode electrode structure set forth in claim 1 wherein the metal is established of submicron sizes of metal particles fused together to establish a reticulate disordered multi-component metal alloy structure substantially conforming to the carbon aerogel by subjecting the metal-laded aerogel to temperature in excess of 600 degrees C.

6. A micro-porous nickelous hydroxide-laded hydride battery positive cathode electrode structure including; micro-porous carbon aerogel comprising a three-dimensional reticulate structure of randomly disposed interengaged carbon fibers; and, a fiber form reticulate structure of nickelous hydroxide made to substantially conform with and extending throughout the carbon aerogel in supported engagement with the carbon fibers thereof.

7. The micro-porous nickelous hydroxide-laded hydride battery positive cathode electrode structure set forth in claim 6 wherein the nickelous hydroxide is made to substantially conform with the carbon aerogel by lading the alcogel structure with a solution of nickelous nitrate and formic acid where the nitrate action in the nickelous nitrate solution is reduced electrochemically to nickelous hydroxide thereby lading the carbon aerogel with nickelous hydroxide.

8. A hydrogen hydride battery comprising a case, a stack of like series connected cells within the case, each cell includes a central porous dielectric electrolyte separator with oppositely disposed outer surfaces, spaced apart micro-porous metal disordered alloy-laded carbon aerogel anode and micro-porous nickelous hydroxide-laded carbon aerogel cathode electrodes with opposing inwardly disposed inner surfaces in contacting engagement with the outer surfaces of the separator and outwardly disposed outer surfaces, electron collector plates in engagement with and overlying the outer surfaces of the electrodes, the opposing collector plates of adjacent cells are in electric contact engagement with each other, terminal posts connected with the collector plates at the opposite ends of the stack of cells and are accessible at the exterior of the case, an electrolyte solution in the case saturates the separators and permeating portions of the electrodes engaged therewith; and, an external electric circuit connected with and between the terminal posts.

9. The hydrogen hydride battery set forth in claim 8 wherein said negative anode electrodes are like structures and each includes a micro-porous carbon aerogel comprised of randomly disposed and shaped carbon fibers defining a three-dimensional reticulate structure, and a three-dimensional reticulate structure of hydrogen-absorbing disordered metal alloy made to substantially conform with and extending throughout and carried by the fibers of the carbon aerogel and defining surfaces replete with active sites where hydrogen moved into contact therewith is absorbed and releasable held by the metal alloy.

10. The hydrogen hydride battery set forth in claim 8 wherein said positive cathode electrodes are like structures and each includes a micro-porous carbon aerogel comprised of randomly disposed and shaped carbon fibers defining a three-dimensional reticulate structure, and a three-dimensional reticulate structure of nickelous hydroxide made to substantially conform with and extending throughout and carried by the fibers of the carbon aerogel and defining surfaces replete with active sites where hydroxyl ions moved into contact therewith is absorbed and forms nickel oxyhydroxide.

11. The hydrogen hydride battery set forth in claim 8 wherein said negative anode electrodes are like structures and each includes a micro-porous carbon aerogel comprised of randomly disposed and shaped carbon fibers defining a three-dimensional reticulate structure, and a three-dimensional reticulate structure of hydrogen-absorbing disordered metal alloy made to substantially conform with and extending throughout and carried by the fibers of the carbon aerogel and defining surfaces replete with active sites where hydrogen moved into contact therewith is absorbed and releasable held by the metal alloy; said positive cathode electrodes are like structures and each includes a micro-porous carbon aerogel comprised of randomly disposed and shaped carbon fibers defining a three-dimensional reticulate structure, and a three-dimensional reticulate structure of nickelous hydroxide made to substantially conform with and extending throughout and carried by the fibers of the carbon aerogel and defining surfaces replete with active sites where hydroxyl ions moved into contact therewith is absorbed and forms nickel oxyhydroxide.

* * * * *